(12) United States Patent
Johansson et al.

(10) Patent No.: US 8,385,926 B2
(45) Date of Patent: Feb. 26, 2013

(54) METHOD AND APPARATUS FOR GENERATING COVERAGE IN A CELLULAR NETWORK

(75) Inventors: Martin Johansson, Mölndal (SE); Mats H Andersson, Göteborg (SE); Ingemar Folke Karlsson, Kållered (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 340 days.

(21) Appl. No.: 12/517,323

(22) PCT Filed: Dec. 11, 2006

(86) PCT No.: PCT/SE2006/001411
§ 371 (c)(1),
(2), (4) Date: Jun. 2, 2009

(87) PCT Pub. No.: WO2008/073007
PCT Pub. Date: Jun. 19, 2008

(65) Prior Publication Data
US 2010/0075683 A1    Mar. 25, 2010

(51) Int. Cl.
*H04W 40/00* (2009.01)
*H04B 7/14* (2006.01)
*H04J 1/10* (2006.01)
*H04J 3/08* (2006.01)

(52) U.S. Cl. ...................... 455/446; 370/315

(58) Field of Classification Search ............... 455/446; 370/315
See application file for complete search history.

(56) References Cited

U.S. PATENT DOCUMENTS

| | | | |
|---|---|---|---|
| 7,406,295 B1* | 7/2008 | Yarkosky | 455/9 |
| 7,480,486 B1* | 1/2009 | Oh et al. | 455/7 |
| 2001/0031621 A1* | 10/2001 | Schmutz | 455/7 |
| 2005/0176367 A1* | 8/2005 | Verloop et al. | 455/11.1 |
| 2006/0040616 A1* | 2/2006 | Wheatley | 455/67.11 |
| 2006/0193280 A1* | 8/2006 | Lee et al. | 370/315 |
| 2007/0036123 A1* | 2/2007 | Armour et al. | 370/344 |
| 2007/0217433 A1* | 9/2007 | Doppler et al. | 370/400 |
| 2008/0043637 A1* | 2/2008 | Rahman | 370/254 |
| 2008/0299897 A1* | 12/2008 | Mohebbi | 455/11.1 |
| 2009/0227202 A1* | 9/2009 | Doppler et al. | 455/11.1 |

FOREIGN PATENT DOCUMENTS

| | | |
|---|---|---|
| EP | 1333596 A1 | 8/2003 |
| JP | 2003318803 A | 11/2003 |
| JP | 2003-101465 * | 4/2004 |
| JP | 2004-328665 A * | 11/2004 |
| WO | WO 03058984 A2 | 7/2003 |

OTHER PUBLICATIONS english abstract/description of JP 2003-318803. Accessed/generated Jul. 2011.*

* cited by examiner

*Primary Examiner* — Nathan Mitchell
(74) *Attorney, Agent, or Firm* — Roger S. Burleigh

(57) ABSTRACT

A sub-node, such as a repeater station or relay station, equipped with a multi-beam sub-node link antenna. The beams of the sub-node link antenna allow communication between the sub-node and at least two nodes (access points/base stations) $11_{A\text{-}B}$; $11_{A\text{-}E}$. The sub-node is further provided with at least one transmitting and receiving coverage antenna to generate coverage in at least one geographical secondary coverage area a; a-c, and a control mechanism that selects one of the nodes to extend the geographical primary coverage area A-B; A-E of the node $11_{A\text{-}B}$; $11_{A\text{-}E}$ to include the geographical secondary coverage area a; a-c of the sub-node. The invention is also related to a cellular communication network, and a method for generating coverage in a cellular communication network.

14 Claims, 6 Drawing Sheets

METHOD AND APPARATUS FOR GENERATING COVERAGE IN A CELLULAR NETWORK

TECHNICAL FIELD

The present invention relates to a method and apparatus for improving coverage in a cellular network.

BACKGROUND

Wide-area coverage is achieved in a number of ways in today's systems. Examples of existing access point coverage solutions include high-gain antennas, higher-order receive diversity, transmitter coherent combining (TCC), and high-altitude antennas (up to hundreds of meters above ground).

All these solutions are based on adapting the access point configuration to enhance the coverage. On downlink, increased EIRP (Effective Isotropic Radiated Power), as provided by high-gain antennas and TCC, gives increased signal strength at the terminal (user equipment). On uplink, high-gain antennas and higher-order receive diversity provide an increase in effective access point receiver sensitivity by extracting additional signal energy using effectively larger antenna apertures. Finally, high-altitude antenna installations provide enhanced coverage (on downlink and uplink) by reducing the path loss.

The solutions outlined above provide increased coverage, but often with a marginal rate of return that approaches zero (or becomes small enough not to warrant implementation of the solution) when the desired improvement in coverage is significant, say tens of dBs or more in terms of signal strength. The drawbacks of some existing solutions, in terms of their providing major coverage improvements, are presented below.

High-gain antennas derive their high gain from a decrease in half-power beamwidth (which is directly related to the antenna size). However, the smallest useful beamwidth is limited by the angular spread of the propagation environment, which means that the effective installed antenna gain becomes significantly lower than that of the antenna in free space when the (free-space) beam is too narrow. The smallest useful beamwidth, in the elevation plane, is also limited by the expected sway profile of the tower or mast: the beam must be wide enough to maintain proper illumination of the desired coverage area within the interval of realized pointing directions that result from tower or mast movement. High-gain antennas can provide coverage improvement on both uplink and downlink.

Transmitter coherent combining (TCC) is based on using multiple (power) amplifiers in parallel and combining their output signals to generate an effective output power equal to the sum of the output powers of the individual amplifiers. One drawback of additional amplifiers is increased energy consumption related to running and cooling the amplifiers, which gives increased OPEX. TCC is a downlink-only method for coverage improvement.

Higher-order receive diversity works by extracting signal energy using multiple sensors (antennas) at different locations, in different directions, and/or with multiple polarizations. It requires an additional uplink radio chain (including antenna, tower-mounted amplifier, feeder, and radio) for each additional sensor, which gives increased capital expenditures. It also requires larger than conventional cabinets to accommodate the extra receiver equipment. Higher-order receive diversity is an uplink-only method.

The hitherto described methods for generating increased coverage (wide-area coverage) share the common drawback that a 3 dB increase of coverage requires a doubling of the "equipment": the area of high-gain antennas must double for every additional 3 dB of gain, TCC requires twice as many amplifiers for a 3 dB gain, and twice as many receiver radio chains are needed to get a higher-order receive diversity gain of 3 dB (ignoring gain due to fading statistics, which approaches zero when the number of receiver chains is large). Obviously, there is a limit for any practical application at which the cost, i.e. capital expenditures (CAPEX) and/or operational expenditures (OPEX), and sheer volume and weight of the equipment make these types of coverage solutions unsuitable.

Yet another coverage method is high-altitude antennas which improve the path loss by providing line-of-sight propagation to a larger part of the coverage area, be it directly to terminals or to reflection/diffraction points in the environment. Because of the large distance to ground, the signal correlation over the antenna aperture may also be improved resulting in higher effective gain (approaching the free-space gain). However, high-altitude antennas require high masts or towers and may require long feeder cables. The former can make the total access point very expensive (CAPEX), whereas the latter can be both costly and inefficient due to transmission losses in the feeders (CAPEX and OPEX). High-altitude antennas can provide coverage improvement on both uplink and downlink.

In conclusion, present access point-based coverage solutions can provide improved coverage, but become increasingly inefficient as the coverage requirements are raised.

Traditional repeaters are also used to create coverage. However, a traditional repeater uses one single sub-node link antenna with a single main beam for communication with one specific access point. This can be a very poor solution in many systems. For example, in CDMA systems, a property called cell breathing is common. Cell breathing refers to the (slow) dynamic expansion and contraction of the footprint of a CDMA cell, which may depend on the number of users connected at any given moment or, in general, the traffic load in the cell and which can be used to balance the load between neighboring cells. Pro-active cell breathing (and cell optimization in general) can be achieved by for example tuning of pilot power and antenna tilt. Since a traditional repeater provides coverage for a fixed area, it defeats the purpose of pro-active cell breathing by always providing coverage over a particular area for the same access point. In addition, the quality of the communications link between access point and repeater is affected by the cell breathing, when cell breathing is performed using power control of cell-defining pilot signals or antenna tilt. In this case, the performance in the area covered by the repeater may show unacceptably large fluctuations.

An example of a prior art bidirectional repeater for wireless communication systems is disclosed in EP 1 445 876, assigned to California Amplifier Inc. The disclosed repeater is provided with a link antenna to establish communication with a dedicated base station (access point) and a bidirectional coverage antenna to generate coverage in a geographical area poorly covered, or not covered at all, by the base station coverage antenna. This type of repeater may be used in a communication system as shown in FIG. 1. One base station 2$_A$ is provided with an antenna system 3 that generates coverage to a geographical primary coverage area "A". The same antenna system 3 (including transmitting and receiving antennas) communicates via signals 4 with a repeater 5$_a$. The repeater 5a receives and transmits signals to the base station $2_A$ using a link antenna 6, and generates coverage to a geographical secondary coverage area "a" using a coverage antenna 7. A terminal 8 communicates via signals 9 with the repeater $5_a$ using the coverage antenna 7, and a communication link between the terminal 8 and the base station 2 is established through the secondary coverage area a provided by the repeater.

In U.S. Pat. No. 4,727,590, by Minori Kawano et al., a repeater is disclosed having a link antenna to establish communication with one or more dedicated base stations (access points) and a receiving antenna to receive signals in up-link from a terminal close to the repeater and direct the signals to the base station closest to the terminal. The terminal receives signal in down-link directly from the base station coverage antenna. This type of communication network is shown in FIG. 2 comprising three base stations $2_A$, $2_B$, $2_C$. Each base station is provided with an antenna system $3_A$, $3_B$, $3_C$ that generates coverage to geographical primary coverage areas A, B and C, respectively. These primary coverage areas are normally overlapping, but a straight line is drawn for illustrating purposes. A repeater $5_{abc}$ is arranged at a position with equal distance to the three base stations, and all three base stations communicate with the repeater independently of each other. The repeater $5_{abc}$ is provided with receive coverage antennas to receive signals from terminals 8 close to the repeater $5_{abc}$, and transmit link antennas to communicate with the base station. Only secondary reception coverage areas a, b and c are thus generated by the repeater. In up-link, a terminal 8 arranged within secondary reception coverage area b transmits a signal to the repeater $5_{abc}$, and the repeater then forwards an amplified signal to the base station $2_B$. In down-link, the base station directly transmits a signal to the terminal 8.

A problem with the existing repeater stations, or relay stations, is the imperfect coverage performance in a cellular network. The existing cell plan, with its location of access points (base stations), cannot provide cell-wide coverage, at points within the desired coverage area, or at the border of the desired coverage area, or both.

SUMMARY

An object with the present invention is to provide an apparatus, a communication network, and a method and computer software that will improve coverage performance in a cellular communication system compared to prior art techniques.

A solution to this object is provided by a sub-node, such as a repeater station or relay station, equipped with a multi-beam sub-node link antenna. The beams of the sub-node link antenna allow communication between the sub-node and at least two nodes (access points/base stations). The sub-node is further provided with a control mechanism that selects one of the nodes to extend the geographical primary coverage area of the node to include at least one of the geographical secondary coverage areas of the sub-node.

An advantage with the present invention is that a network with a flexible coverage may be achieved.

Another advantage is that simultaneous connections to multiple nodes provides the operator with the possibility to adaptively control which node(s) should serve the area covered by the sub-node.

Another advantage is that the sub-node may automatically adapt to variations in the different communications links in a system with cell size variations, such as cell breathing in CDMA systems, or otherwise varying properties of the communications links between the sub-node and the multiplicity of nodes connected to the sub-node via the link antenna(s), thereby providing optimum performance in the area covered by the sub-node.

Another advantage is that a remotely-controlled version of the sub-node may be used by the operator to offer the best possible cell plan, for the available nodes and given the antenna coverage of the sub-node, at any given instant in time, which allows for load-balancing between nodes.

Further objects and advantages are apparent for a skilled person from the detailed description below.

DETAILED DESCRIPTION

The invention is directed towards a repeater station or a relay station for use in a cellular communication network having one or more access points (base stations). In the claims, node is used for an access point and sub-node is used for a repeater station or a relay station. In this application a repeater station is considered to only amplify the received signals (both from a terminal situated in a coverage area of the repeater station and from a node). A relay station is considered to contain more functionality.

Figure 1:
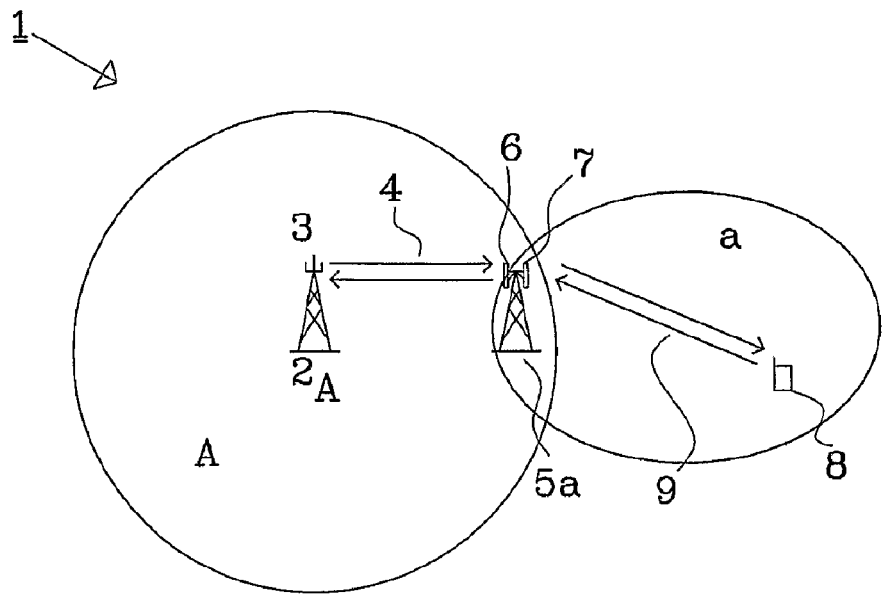
FIGS. 1 and 2 show communication networks using prior art repeaters to improve coverage performance.
Figure 2:
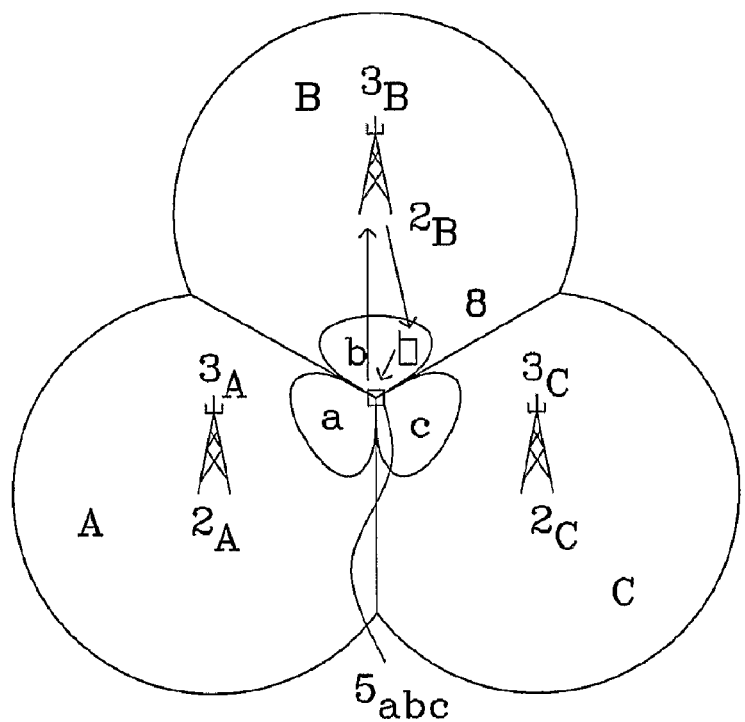
Figure 3:
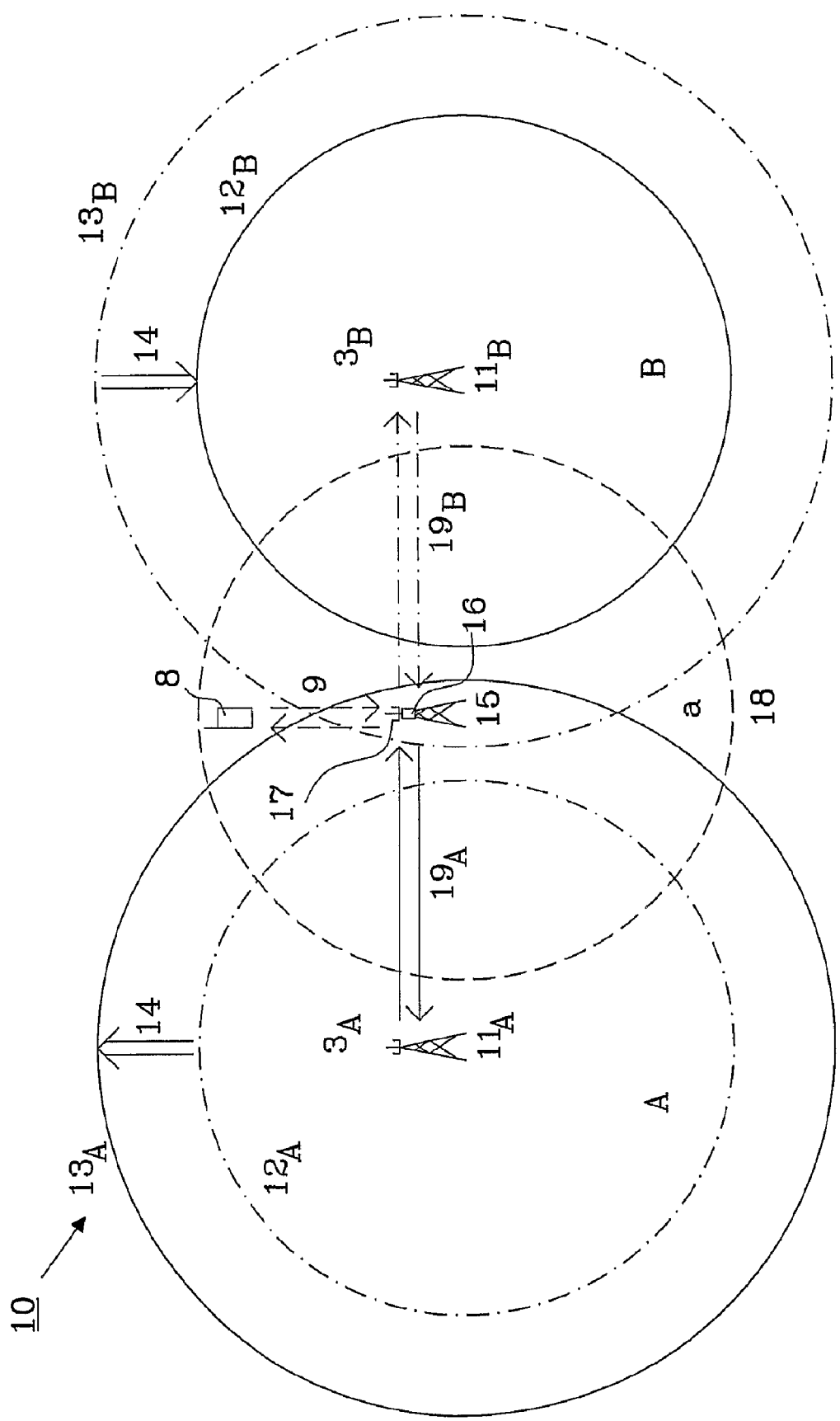
FIG. 3 shows a first embodiment of a communication system according to the invention.

The principle idea of the invention is illustrated in FIG. 3 for the case of a sub-node with a circular cylindrical sub-node multi-beam link antenna. In addition to the advantages offered by conventional repeater solutions (for example no need for wireline or wireless transmission of backbone-type data, such as IP traffic, to a site, and no need for complete base station equipment), the present invention provides for significantly better performance by exploiting the availability (through the multi-beam link antenna) of a multiplicity of signals from different access points, i.e., nodes.

A major problem facing solutions based on single-antenna (single-beam) sub-nodes was introduced above, namely cell breathing. A multi-beam sub-node, on the other hand, is particularly well suited to handle cell breathing, since it has simultaneous connections to multiple access points via the multi-beam link antenna. The sub-node can enhance the positive aspects of cell breathing, for example load-balancing between cells in a CDMA system, by controlling which of the access points should be associated with the "sub-node coverage antenna", i.e., the antenna whose beam defines the coverage area of the sub-node.

FIG. 3 shows a first embodiment of a communication system 10, which is simplified and only comprises two nodes (access points) $11_A$, $11_B$, each provided with an antenna system $3_A$, $3_B$ that generates coverage to a geographical primary coverage area "A" and "B", respectively. Omnidirectional antenna systems are in this embodiment used for the node antenna systems $3_A$ and $3_B$. A sub-node (repeater or relay station) 15 is in this embodiment provided with a circular cylindrical sub-node link antenna 16 and a coverage antenna 17 that generates coverage in a secondary coverage area "a". The secondary coverage area "a" is indicated using a dashed line 18, and a user terminal 8 is situated within the secondary coverage area "a" and communicates with the sub-node 15, as indicated by the dashed arrows 9. The link antenna 16 is a multi-beam link antenna that communicates with both node $11_A$ and $11_B$.

The secondary coverage area "a" remains in this example unchanged over time. However, the primary coverage area "A" and "B" may change over time and this is illustrated by arrows 14, and a dash-dot line $12_A$, $13_B$ and a continuous line $13_A$, $12_B$ around the nodes $11_A$ and $11_B$, respectively.

To illustrate the operation of the invention, it is assumed that the primary coverage area of each node is as indicated by the dash-dot lines $12_A$, $13_B$. The primary coverage area "B" is larger than the primary coverage area "A", and the signals received by the sub-node link antenna 16 from node $11_B$ are stronger, or have better C/I (carrier-to-interference ratio), than the signals received from node $11_A$. The sub-node 15 includes a control mechanism, as described in more detail below, that either automatically selects which node to communicate with, or is manually controlled by an operator. In this example, the sub-node 15 selects to communicate with node $11_B$ as indicated by the dash-dot arrows $19_B$. Thus, the user terminal 8 has an established communication link with node $11_B$, since the coverage of node $11_B$ has been extended to include the secondary coverage area "a".

At a later point of time, the primary coverage area "A" is larger than the primary coverage area "B" as indicated by the continuous lines $13_A$ and $13_B$. The change in the size of the primary coverage areas "A" and "B" may be a deliberate change by the communication network operator to optimize the network capabilities, but may also be a change due to cell breathing in a CDMA system. When the primary coverage area "B" is decreasing in size and the primary coverage area "A" is increasing in size, the quality of the signals, as measured by for example power level or pilot C/I, received by the sub-node link antenna 16 from node $11_A$ increases compared to the signals received from node $11_B$. The sub-node 15 then selects, as illustrated in connection with FIGS. 6 and 7, to communicate with node $11_A$, instead of node $11_B$, as indicated by the continuous arrows $19_A$.

The process of selecting which access point's signals are "repeated" or "relayed" can be based on a number of control mechanisms. For example, a power meter may gauge the incoming (downlink) power from the access points and the sub-node may then select the access point (node) with the highest power. This process can involve a number of specific components and methods. In the case of an FDD (frequency-division duplex) system, a narrowband filter may be used to only extract downlink signals for the operator using (owning) the sub-node. One filter will typically be required for each of the beams pointing towards the available access points, such that the power meter (one per beam) only measures the level of the operator's signals. The power meter may report instantaneous or, maybe more desirable, time-averaged power level, which can be used by a control unit as one of (potentially) many quantities on which to base the decision of which access point's signals should be "repeated". The hardware realization of the sub-node beam selection can be based on using a switch between the multi-beam sub-node link antenna and the repeater coverage antenna. A gradual up- and down ramping of signals corresponding to different access points is another possibility. In the case of a CDMA system, the terminals (user equipments) in the area covered by the repeater may then temporarily be in handover.

The sub-node may also be remotely controlled, thus allowing performance optimization from an operations center. In this case, the operator can adaptively change the cell plan to best suit the traffic situation. For instance, if an access point's signals are repeated and this access point becomes heavily loaded (many users or high data rates), the operator can command the sub-node to switch to another access point of the multiplicity of access points available to the sub-node.

Another problem that can be handled by the repeater is variations in the quality of the communications links between the sub-node and the access points. These variations may be of a "short-term" nature, for example due to precipitation, or of a "longer term" nature, for example caused by changes in the propagation environment not envisioned at the time of the sub-node installation.

Figure 4:
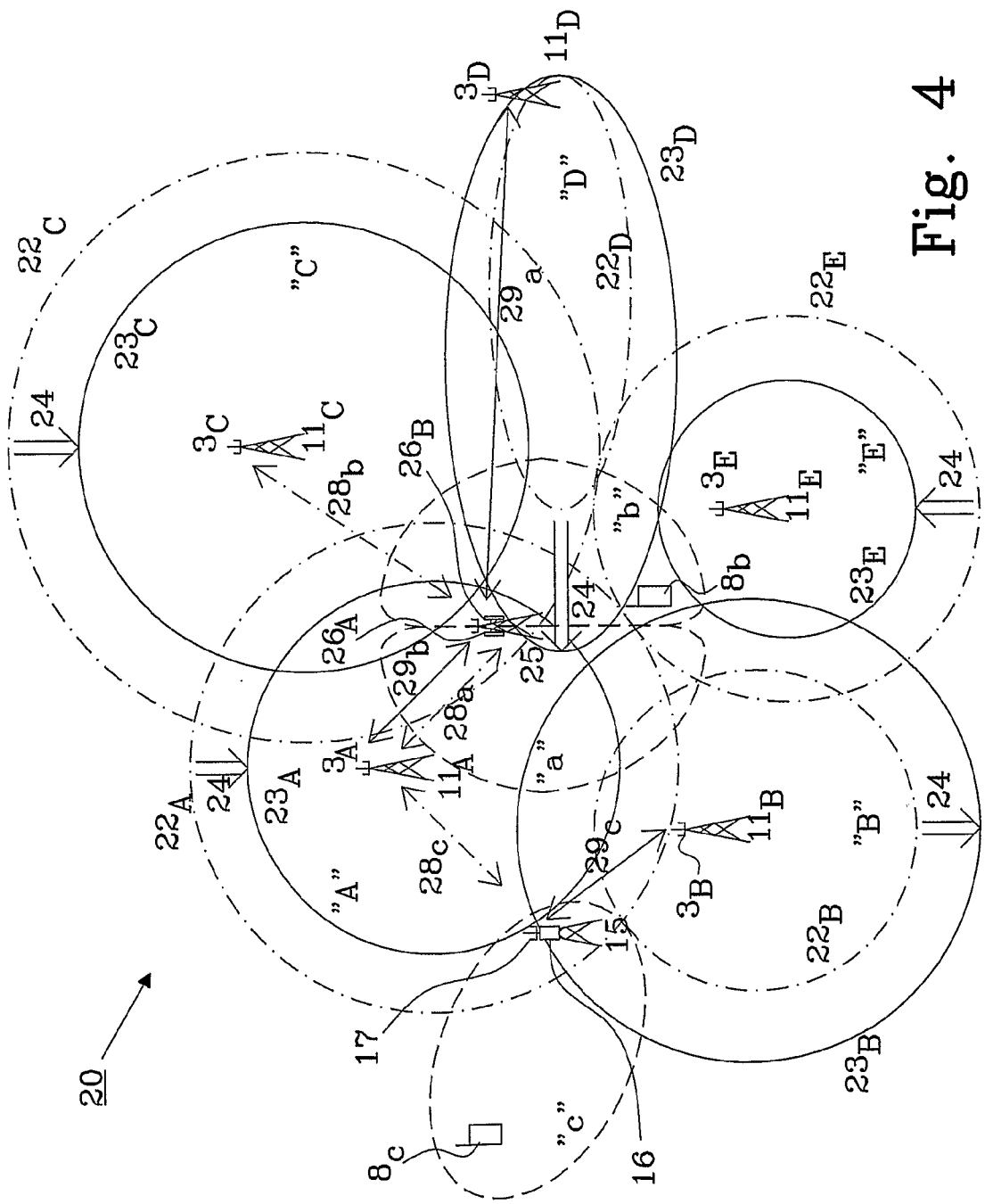
FIG. 4 shows a second embodiment of a communication system according to the invention.

FIG. 4 shows a second embodiment of a communication system 20 having a more complex structure to illustrate further advantageous features of the present invention. Five nodes $11_{A-E}$ acting as access points for two sub-nodes 15, 25 are illustrated. Each node has an antenna system $3_{A-E}$, and generates a primary coverage area "A"-"E" that may vary in size as indicated by arrows 24 over time. Dash-dot lines $22_{A-E}$ indicate an initial primary coverage area for each node, and continuous lines $23_{A-E}$ indicate changed primary coverage area for each node at an other point of time. A first sub-node 15 has a coverage antenna 17, which generates coverage to only one secondary coverage area "c", and a circular cylindrical multi-beam sub-node link antenna 16, which receives signals from at least two access points (nodes) $11_A$, $11_B$. A communication link is established between a terminal $8_c$ situated in the secondary coverage area "c" and a selected node, as described in connection with FIG. 3.

A second sub-node 25 has a coverage antenna 27, which generates coverage to two secondary coverage areas "a" and "b", and two multi-beam sub-node link antennas $26_A$, $26_B$, each receive signals from at least two access points (nodes) $11_A$, $11_B$, and $11_C$, $11_D$, $11_E$, respectively. A communication link between a terminal $8_b$ situated in the secondary coverage area "b" and a selected node is described in connection with FIGS. 6 and 7. It is of course possible to use single-beam link antennas instead of multi-beam link antennas to establish communication between the sub-node and one of the access points, but it is preferred that multi-beam link antennas are used.

Dash-dot arrows 28 are used to indicate two-way communication for the initial primary coverage areas, as illustrated by dash-dot lines $22_{A-E}$. A first dash-dot arrow $28_a$ indicates two-way communication between the second sub-node 25 and a selected node $11_A$ to extend the coverage area of the node to include the secondary coverage area "a", and a second dash-dot arrow $28_b$ indicates two-way communication between the second sub-node 25 and a selected node $11_C$ to extend the coverage area of the node to include the secondary coverage area "b". A third dash-dot arrow $28_c$ indicates two-way communication between the first sub-node 15 and a selected node $11_A$ to extend the coverage area of the node to include the secondary coverage area "c".

In similar fashion, continuous arrows 29 are used to indicate two-way communication between sub-nodes and nodes when the primary coverage areas have changed as indicated by the continuous lines $23_{A-E}$. A first continuous arrow $29_a$ indicates two-way communication between the second sub-node 25 and a selected node $11_D$ to extend the coverage area of the node to include the secondary coverage area "a", and a second continuous arrow 29$_b$ indicates two-way communication between the second sub-node 25 and a selected node 11$_A$ to extend the coverage area of the node to include the secondary coverage area "b". A third dash-dot arrow 29$_c$ indicates two-way communication between the first sub-node 15 and a selected node 11$_B$ to extend the coverage area of the node to include the secondary coverage area "c".

Figure 5:
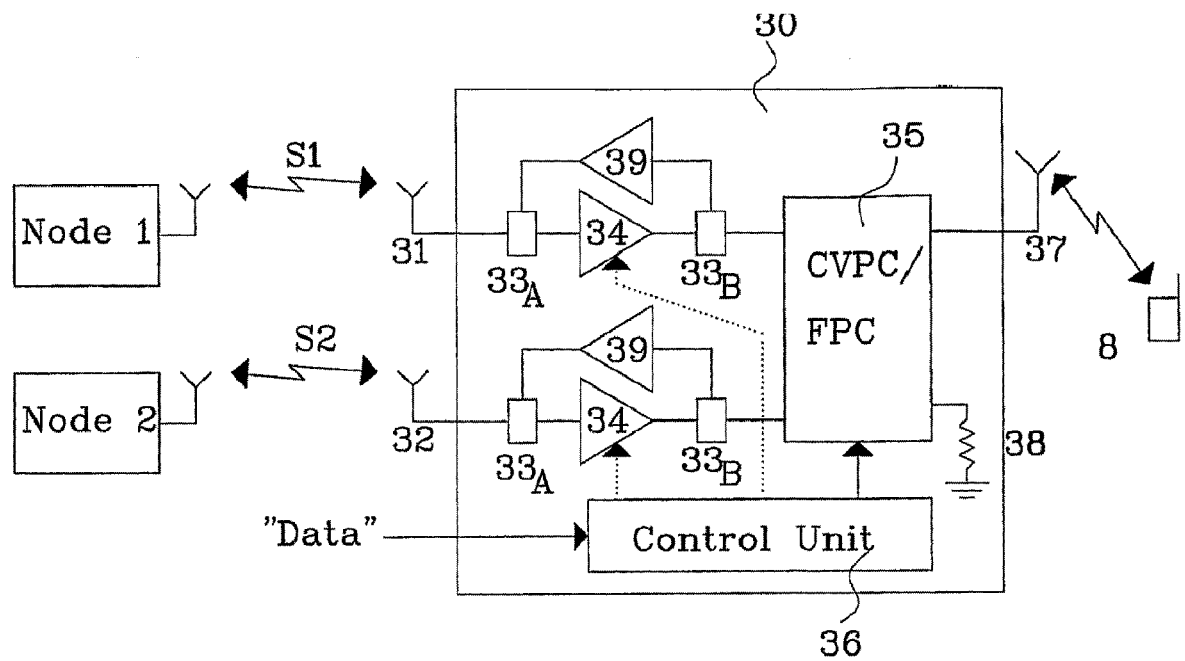
FIG. 5 shows an embodiment of a sub-node according to the invention.

FIG. 5 shows a sub-node 30 comprising two single-beam link antennas 31 and 32 configured to receive signals transmitted from coverage antennas at node 1 and node 2. Each signal is forwarded via a first duplexer 33$_A$ to a continuously variable low noise amplifier 34 which is provided for each received signal S1 and S2. The amplified signals are fed, via a second duplexer 33$_B$ into a power combiner 35, e.g. a continuously variable power combiner (CVPC) or fixed power combiner (FPC). The power combiner 35 is controlled by a control unit 36, and the received amplified signals are in this embodiment combined into a sub-node transmit signal which is transmitted to a terminal 8 present in a secondary coverage area using a sub-node coverage antenna 37. A load impedance 38 is also provided to take care of excess power in the power combiner 35.

The control unit is provided with data to control the operation of the sub-node 30. The data could be provided directly from a network operator in the case where the operation of the sub-node is manually controlled, or provided from nodes, operation maintenance centers (OMC), etc. in the case where the operation of the sub-node is automatically controlled. There is also a possibility that the sub-node 30 gather information from neighboring nodes and terminals present within the secondary coverage area, and using the gathered information control the operation of the sub-node. However, this requires a more sophisticated and complex sub-node, such as a relay station.

The power combiner 35 will combine the received signals and weight the signals in accordance to the control signal from the control unit 36. Optionally, the control unit 36 may control the gain in the low noise amplifiers 34 to weight the received signals before the power combiner 35 combines them into the signal that will be transmitted from the coverage antenna 37. The power combiner 35 could also be provided with phase shifters and switches to select a secondary coverage are if the sub-node is designed to service more than one secondary coverage area.

A signal transmitted from the terminal 8 is received at the sub-node coverage antenna 37, through the power combiner 35 and divided into one or two signals, depending on the control signals from the control unit 36. Each signal is fed via the second duplexer 33$_B$ to a low noise amplifier 39. Each amplified signal is fed to link antenna 31 and 32, respectively, via the first duplexer 33$_A$. The signal is thereafter transmitted and received by the coverage antenna at Node 1 and Node 2.

The duplexer is normally used in system employing FDD (frequency division duplex), but in TDD (time division duplex), each duplexer is replaced by a switch to perform the same function.

The described sub-node in FIG. 5 has only one secondary coverage area and continuously selects which of the primary coverage areas of the two nodes should be extended to include the secondary coverage area. This may be generalized to two or more secondary coverage areas. For higher numbers of secondary coverage areas and/or nodes, the block diagram becomes more complex, but still realizable using the same types of components and optionally includes additional phase shifters and switches.

The coverage antenna 37 may be an adaptive antenna that may change the number of beams and adapt the geographical coverage area provided by each beam as shown in FIGS. 8a-8c and 9.

Figure 6:
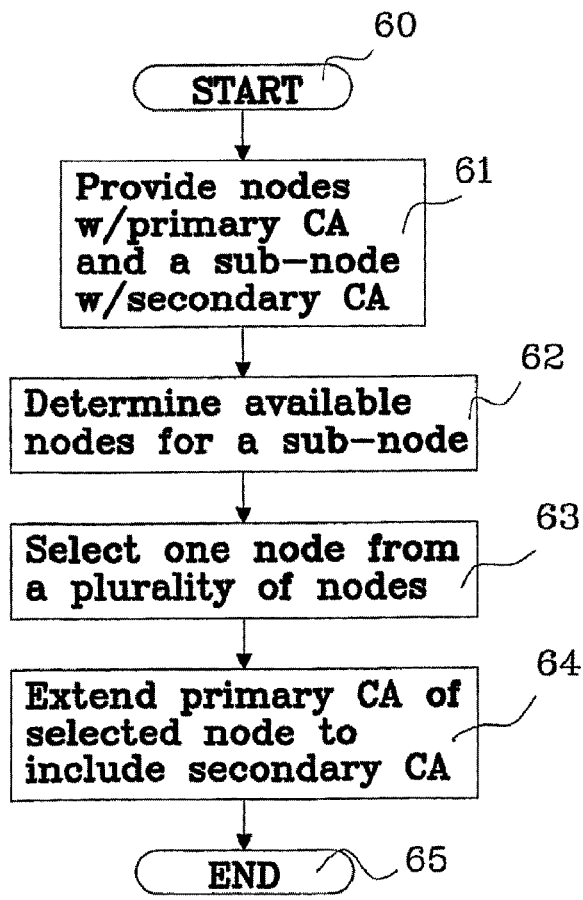
FIG. 6 shows a flow chart of the sub-node operation.

FIG. 6 shows a flow chart for operation of a sub-node, preferably implemented as a computer program installed in the control unit 36 and executed by a microprocessor in the sub-node 30 described above. The process starts in 60 and a plurality of nodes with a primary coverage area (CA) are provided in the first step 61 together with providing at least one sub-node with a secondary coverage area. The nodes will function as access points for the sub-node, and the sub-node may be a repeater station or a relay station, as described above.

In the next step 62, the sub-node determines available nodes, i.e., the sub-node is provided with one or more link antennas to receive signals from at least two nodes (access points), and a control unit determines which of the received signals have an acceptable signal strength and quality to be qualified as an available node.

Only one of these available nodes may be selected, which is performed in step 63. There are several possible implementations of a control mechanism for selecting a node, and these are described in more detail in connection with FIG. 7. Irrespectively how this is performed, the primary coverage area of the selected node is thereafter extended to include the secondary coverage area of the sub-node in step 64. The flow ends in 65.

Figure 7:
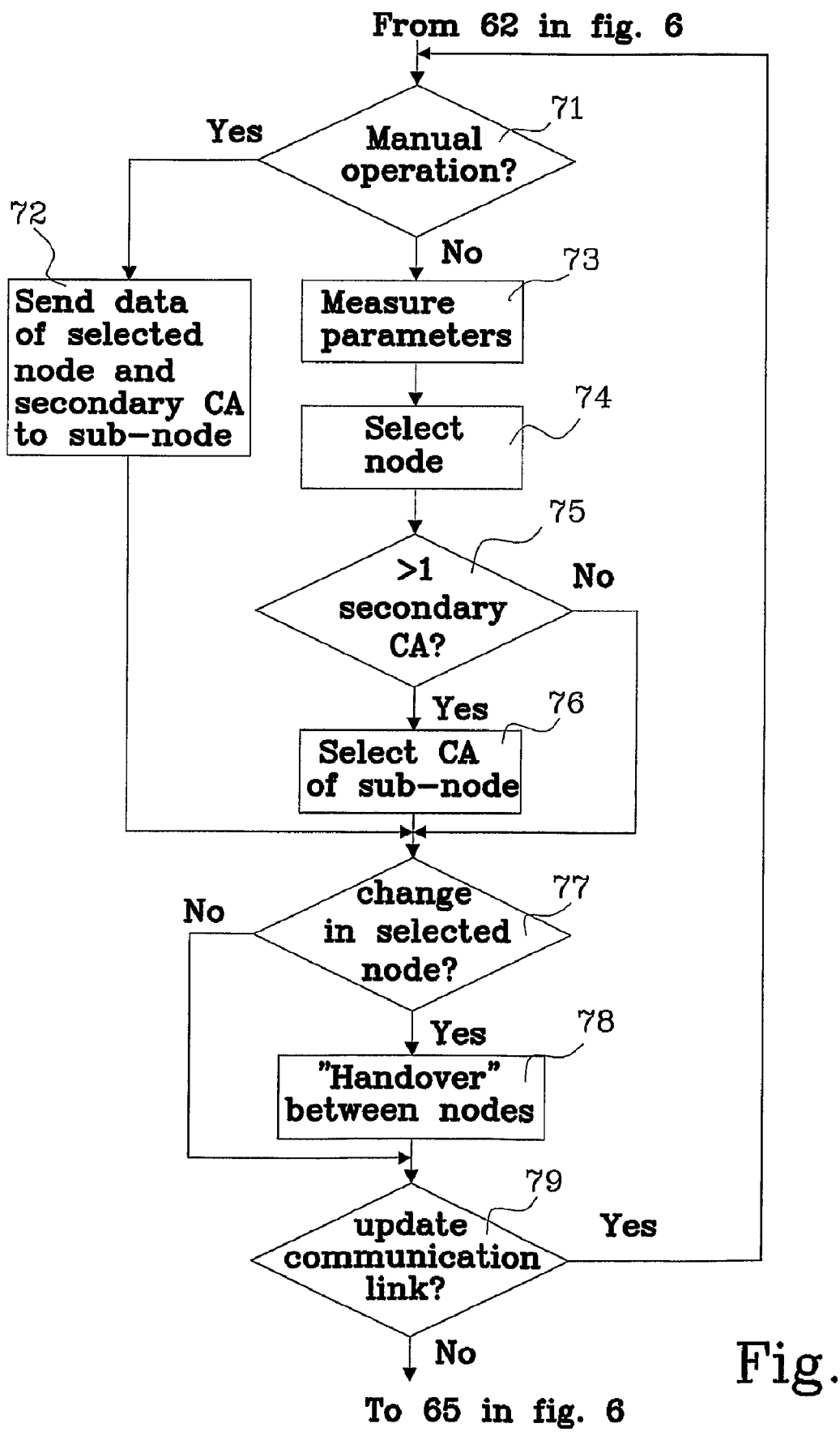
FIG. 7 shows a more detailed flow chart of the sub-node operation.

FIG. 7 will describe in more detail how the selection of a node may be performed and the flow continues from step 62 in FIG. 6, and in dependency of whether the selection of a node is going to be made by an operator (manually) or be made automatically by measuring parameters in the communication network, the flow continues via step 71 to step 72 (manual operation) or to step 73 (automatic operation).

In the manual mode, step 72, data is sent to the sub-node containing the selected node and the secondary coverage area to which the primary coverage area of the selected node is going to be extended. If the sub-node only has one secondary coverage area, this information is not needed to extend the primary coverage area of the selected node to include the secondary coverage area of the sub-node. The flow continues thereafter in step 77.

In the automatic mode, steps 73-76, desired parameters, such as traffic load, signal quality, power level, etc., are measured in step 73. Example of measurable parameters that reflects signal quality includes bit rate, bit error rate, frame error rate, signal-to-noise-ratio (SNR), etc. The desired parameter is preferably measured on a pilot signal or traffic channel signals. Dependent on the measured parameters in step 73, a node is selected in step 74. If there is only one secondary coverage area of the sub-node, the flow continues to step 77 via step 75. In case of a plurality of secondary coverage areas of the sub-node, the flow continues to step 76 via step 75.

One or more of the secondary coverage areas of the sub-node is selected in step 76, to which the primary coverage area of the selected node shall be extended. This may be implemented as a time dependent selection process in which a predetermined time table is set-up to optimize the usage of the available capacity dependent on the time of day. This may be implemented on a time slot level, where different time slots from a node is transmitted in different secondary coverage areas that are available at the sub-node. In an alternative solution, all signals from a node are transmitted in a first secondary coverage area during a predetermined time interval, e.g. between 6 am and 9 am, and then the signals are transmitted in a second secondary coverage area during the remaining time period, i.e. 9 am to 6 am.

In a time independent selection process, the traffic load of the neighboring nodes that are in communication with the sub-node may be measured, and as a result from these measurements, the selection of a secondary coverage area is made, as described in more detail in connection with FIGS. 8a-8c and 9.

In step 77, a check is performed to determine if there is a change in the selected node that serves the secondary coverage area. If the same node is selected to extend its coverage area to the secondary coverage area, then the flow continues to step 79. In other cases, a hand-over needs to be performed for all active user terminals present in the secondary coverage area, step 78, before the flow continues to step 79. Steps 71-78 are repeated if the communication link should be updated, step 79, or else, the flow continues to step 65 in FIG. 6.

Figure 8A:
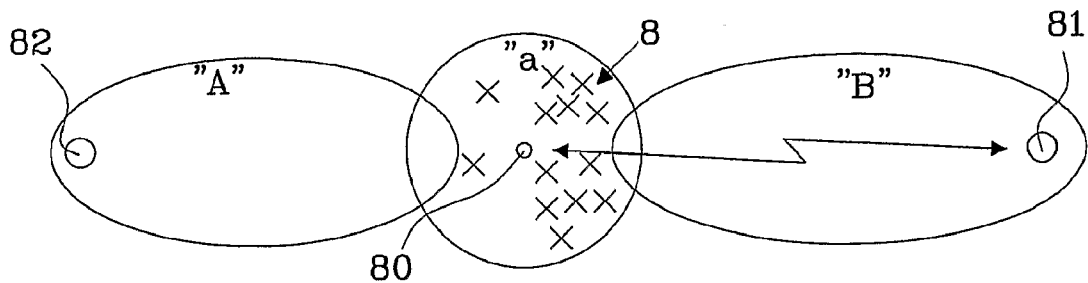
FIGS. 8a-8c illustrates how a coverage area of a sub-node according to the invention changes dependent on traffic load.
Figure 8B:
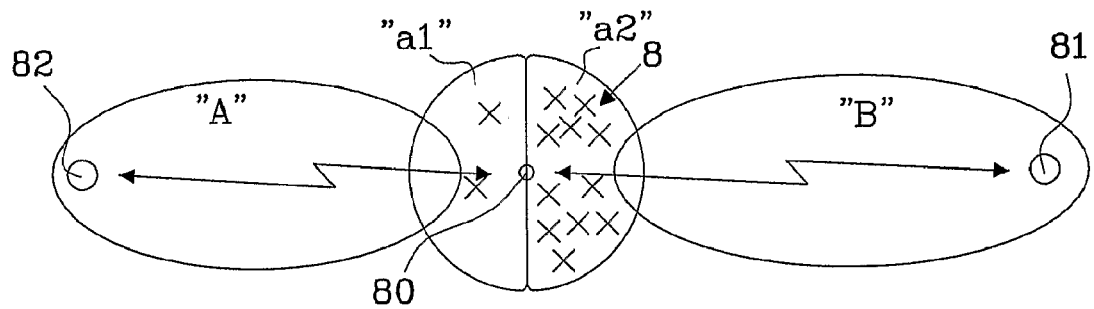
Figure 8C:
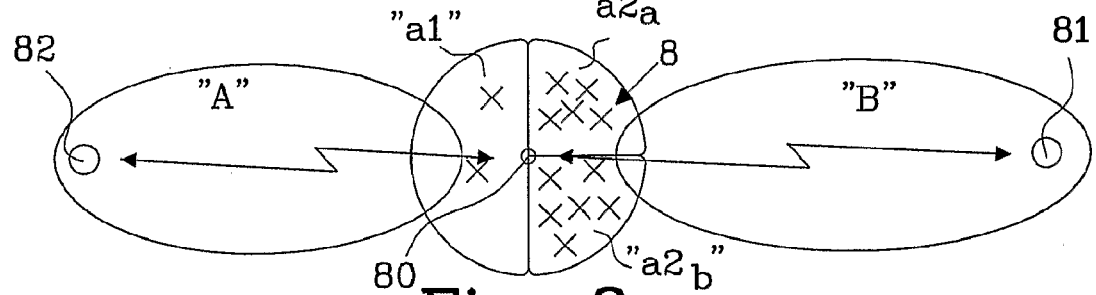

FIGS. 8a-8c illustrates how a coverage area of a sub-node 80 according to the invention changes dependent on a measured parameter, e.g. traffic load in the neighbouring nodes 81 and 82. FIG. 8a illustrates how a primary coverage area "B" of a first node 81 is extended to include a single secondary coverage area "a" of the sub-node 80. Several active user terminals 8 (identified with crosses) are present within the secondary coverage area "a" and the traffic load of either the first node 81 or the sub-node 80 is continuously monitored. When a predetermined traffic load level is reached, the secondary coverage area "a" is divided into two parts, coverage areas "$a_1$" and "$a_2$", as illustrated in FIG. 8b, and the active user terminals in one of the coverage areas are transferred to a second node 82. The primary coverage area "A" of the second node 82 is thus extended to include the divided secondary coverage area "$a_1$", and the primary coverage area "B" is extended to only include the divided secondary coverage area "$a_2$".

Normally this process would be enough to reduce the traffic load of the first node 81 if the active user terminals are spread out evenly within the secondary coverage area "a". Unfortunately, in this example, the majority of the active user terminals 8 are situated within the divided secondary coverage area "$a_2$", and thus the traffic load of the first node 81 still remains. Further actions are needed to redistribute the traffic load to available nodes, i.e. to the second node 82. This may be performed by further dividing the coverage area "$a_2$" into two parts, coverage areas "$a_{2a}$" and "$a_{2b}$". The coverage area "B" of the first node 81 is then extended to include only one of these coverage areas, e.g. coverage area "$a_{2b}$", and the coverage area "A" is extended to include the other part, e.g. coverage area "$a_{2a}$", in addition to coverage area "$a_1$", see FIG. 8c. A more even distribution of the traffic load between the nodes 81 and 82 for active user terminals present within the secondary coverage areas is achieved.

In an alternative example, the size of the secondary coverage areas illustrated in FIG. 8b could be altered by shaping the beams that generate the secondary coverage areas "$a_1$" and "$a_2$". It is possible to alter the beam shape in such a way that the modified coverage area "$a_1$" will cover the area of the combined coverage areas "$a_1$" and "$at_a$", and the modified coverage area "$a_2$" will only cover area "$a_{2b}$".

The operation for dividing the secondary coverage area into smaller parts and altering the beam shape to generate different size of the coverage area is well known to a skilled person in the art from the described antenna system in U.S. Pat. No. 6,246,674 by Feuerstein et al., which is incorporated by reference.

Figure 9:
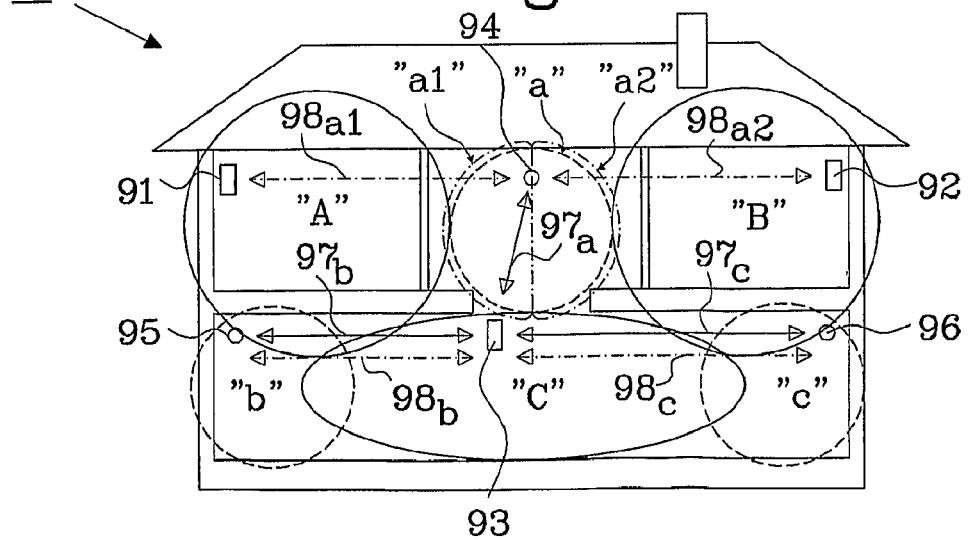
FIG. 9 shows an alternative embodiment of a communication system implemented as a LAN for computer communication.

FIG. 9 shows an alternative embodiment of a communication system 90 implemented as a network for communication, such as LAN, WLAN, GSM, 3G, etc. In the embodiment three nodes 91, 92 and 93 (base stations), which are connected to form said communication network, are provided together with three sub-nodes 94, 95 and 96 (relay or repeater stations) within a building 99. The continuous lines represent the primary coverage areas "A", "B" and "C" of the nodes 91, 92 and 93, respectively. The dashed lines represent the extent of the secondary coverage areas "a", "b" and "c" of the sub-nodes 94, 95 and 96, respectively.

Continuous arrows $97_a$, $97_b$ and $97_c$ illustrates how user terminals present in the respective secondary coverage areas "a", "b" and "c" are in communication with node 93 at a first point of time. Node 91 and node 92 only service user terminals within their primary coverage area "A" and "B", respectively.

User terminals may move within the building and maintain communication with the network, which will shift the traffic load between the nodes. As an example, at a second point of time, user terminals may have moved from the primary coverage area "A" and "B" into the hallway covered by sub-node 94. The traffic load at node 93 will increase since the user terminals within the secondary coverage area "a" are in communication with node 93 (continuous arrow $97_a$). To be able to maintain good operation for the user terminals the secondary coverage area "a" is divided into two secondary coverage areas "a1" and "a2", as illustrated by the dash-dot lines and described in connection with FIGS. 8a-8c.

The primary coverage area "A" is extended to include secondary coverage area "a1" and primary coverage area "B" is extended to include secondary coverage area "a2". For systems supporting it, handover between node 93 and nodes 91 and 92 may naturally be performed in order to not disrupt the communication link for each active user terminal within the secondary coverage areas of sub-node 94. Dash-dot arrows $98_{a1}$, $98_{a2}$, $98_b$ and $98_c$ illustrates how user terminals present in the respective secondary coverage areas "a1", "a2", "b" and "c" are in communication with nodes 91, 92 and 93 at the second point of time.

A further decision basis for coverage area association, the effective distance to active users within a secondary coverage area may be determined by measuring time-delay at the node, which primary coverage area is extended to include the secondary coverage area.

Single or double polarized antennas, as well as any type of diversity antennas, may naturally be used to implement the present invention, and scope of the claims should cover any type of antenna systems that are used for communication purposes between nodes and sub-nodes.

The invention is applicable for mobile communications systems, such as WCDMA, CDMA2000 and WiMAX802.16e, as well as for fixed communications systems, such as WiMAX802.16d.

The invention claimed is:

1. A sub-node configured to be used in a cellular communication network, said sub-node comprising:
at least one transmitting and receiving coverage antenna to generate coverage in at least one geographical secondary coverage area, said sub-node configured to be in communication with a node, generating coverage in a geographical primary coverage area, to extend the coverage of said node to include said at least one geographical secondary coverage area;
at least one link antenna configured to provide communication with a plurality of nodes:
means to divide the at least one geographical secondary coverage area of said at least one sub-node into at least two parts dependent on measured parameters, wherein said parameters include at least the traffic load in the cellular communication network; and, a control mechanism, responsive to said measured parameters, configured to select a first node and a second node from said plurality of nodes to extend coverage of each of said selected first node and second node to include at least one part of said divided geographical secondary coverage area.

2. The sub-node according to claim 1, wherein said means to divide the at least one geographical secondary coverage area comprises means to shape the beams generating the divided secondary coverage areas.

3. The sub-node according to claim 1, wherein said sub-node is a relay station or repeater station.

4. The sub-node according to claim 1, wherein said control mechanism is manually controlled by an operator managing the cellular communication network.

5. A cellular communication network comprising a plurality of nodes each having transmitting and receiving antennas to generate coverage in a geographical primary coverage area, said network comprising:

at least one sub-node having transmitting and receiving coverage antennas to generate coverage in at least one geographical secondary coverage area, said sub-node in communication with a node to extend the coverage of said node to include said at least one geographical secondary coverage area; and, at least one link antenna providing communication with a plurality of nodes;

wherein said at least one sub-node further comprises:
means to divide the at least one geographical secondary coverage area of said at least one sub-node into at least two parts dependent on measured parameters, wherein said parameters include at least the traffic load in the cellular communication network; and, a control mechanism, responsive to said measured parameters, configured to select a first node and a second node from said plurality of nodes to extend each coverage of said selected first node and second node to include at least one part of said divided geographical secondary coverage area.

6. The cellular communication network according to claim 5, wherein said means to divide the at least one geographical secondary coverage area comprises means to shape the beams generating the divided secondary coverage areas.

7. The cellular communication network according to claim 5, wherein at least one of said at least one sub-node is a relay station or a repeater station.

8. The cellular communication network according to claim 5, wherein said control mechanism is manually controlled by an operator managing the cellular communication network.

9. The cellular communication network according to claim 5, wherein said node is a base station.

10. A method for generating coverage in a cellular communication network comprising a plurality of nodes each having transmitting and receiving antennas to generate coverage in a geographical primary coverage area, said method comprising the steps of:

providing at least one sub-node having transmitting and receiving coverage antennas generating coverage in at least one geographical secondary coverage area, said sub-node communicating with a node to extend the coverage of said node to include said at least one geographical secondary coverage area;

providing communication between said at least one sub-node and a plurality of nodes;

dividing the at least one geographical secondary coverage area of said at least one sub-node into at least two parts dependent on measured parameters, wherein said parameters include at least the traffic load in the cellular communication network; and, configuring a control mechanism, responsive to said measured parameters, to select a first node and a second node from said plurality of nodes to extend each coverage of said selected first node and a second node to include at least one part of said divided geographical secondary coverage area.

11. The method according to claim 10, further comprising the step of dividing said at least one geographical secondary coverage area by shaping the beams generating the divided secondary coverage area.

12. The method according to claim 10, further comprising the step of selecting at least one of said at least one sub-node to be a relay or repeater station.

13. The method according to claim 10, wherein said control mechanism is manually controlled by an operator managing the cellular communication network.

14. The method according to claim 10, wherein said node is a base station.

* * * * *

UNITED STATES PATENT AND TRADEMARK OFFICE
CERTIFICATE OF CORRECTION

PATENT NO. : 8,385,926 B2  
APPLICATION NO. : 12/517323  
DATED : February 26, 2013  
INVENTOR(S) : Johansson et al.

Page 1 of 1

It is certified that error appears in the above-identified patent and that said Letters Patent is hereby corrected as shown below:

On the Title Page, Item (56), under "OTHER PUBLICATIONS", in Column 2, Line 1, delete "english" and insert -- English --, therefor.

Signed and Sealed this  
Fourth Day of June, 2013

Teresa Stanek Rea  
*Acting Director of the United States Patent and Trademark Office*